United States Patent
Eek et al.

(10) Patent No.: US 6,190,718 B1
(45) Date of Patent: Feb. 20, 2001

(54) APPARATUS AND METHOD FOR MAKING CITRUS JUICE FROM FROZEN BODIES

(75) Inventors: Lars Eek, Helsingborg (SE); Kenneth I. Fox, Lakeland, FL (US); Sten Pahlsson, Helsingborg (SE)

(73) Assignee: Frigoscandia Equipment AB, Helsingborg (SE)

( * ) Notice: Under 35 U.S.C. 154(b), the term of this patent shall be extended for 0 days.

(21) Appl. No.: 09/332,463

(22) Filed: Jun. 14, 1999

(51) Int. Cl.$^7$ ............................................. A23L 2/00
(52) U.S. Cl. ............................ 426/524; 99/483; 426/399
(58) Field of Search ................................. 426/524, 520, 426/397, 399; 99/483, 443 C

(56) References Cited

U.S. PATENT DOCUMENTS

| | | | |
|---|---|---|---|
| 3,774,409 | 11/1973 | Persson et al. | 62/320 |
| 4,748,029 | 5/1988 | Alfred et al. | 426/231 |
| 4,816,273 | 3/1989 | Smith et al. | 426/393 |
| 5,162,128 | 11/1992 | Mills et al. | 426/599 |
| 5,362,509 | * 11/1994 | Martens | 426/524 |
| 5,494,691 | * 2/1996 | Sizer | 426/399 |
| 5,706,883 | 1/1998 | Ward | 165/61 |
| 5,727,453 | 3/1998 | Tippmann | 99/483 |

OTHER PUBLICATIONS

AGA Frigoscandia Food Process Systems, "PelloFreeze Extends IQF Product Range", Manual 0061–0–001–E (Aug. 1988) pp. 1–3; Manual 0061–1–002–D (Aug. 1988) pp. 1–2; Manual 0061–2–006–E (Oct. 1988) pp. 1–4; Manual 0061–3–003–F (Aug. 1988) pp. 1–3.

\* cited by examiner

*Primary Examiner*—George C. Yeung
(74) *Attorney, Agent, or Firm*—Allen, Dyer Doppelt Milbrath & Gilchrist, P.A.

(57) ABSTRACT

An apparatus for making citrus juice preferably includes a supply of relatively small frozen bodies comprising at least one of citrus juice and pulp, a heating section for adding heat to the frozen bodies to thaw the frozen bodies, and a filling section downstream from the heating section for filling juice containers with citrus juice. The relatively small frozen bodies may have at least one dimension less than about 1.5 inches. The apparatus may also include a pasteurizing section upstream from the filling section. In one embodiment, the supply comprises a plurality of portable containers each containing a plurality of frozen bodies. The heating section preferably comprises a heat transfer tank, a heat transfer fluid in the heat transfer tank, a heater for the heat transfer fluid, and a conveyor for advancing the containers of frozen bodies through the heat transfer fluid. Each portable container may comprise a flexible bag, for example. In accordance with another advantageous feature of the invention, the apparatus may include at least one other supply of liquid citrus juice. A blending tank may be provided between the heating section and the filling section and connected to the at least one other supply of liquid citrus juice. The blending tank permits blending of different citrus juices, and/or for blending with concentrated juices, for example.

29 Claims, 5 Drawing Sheets

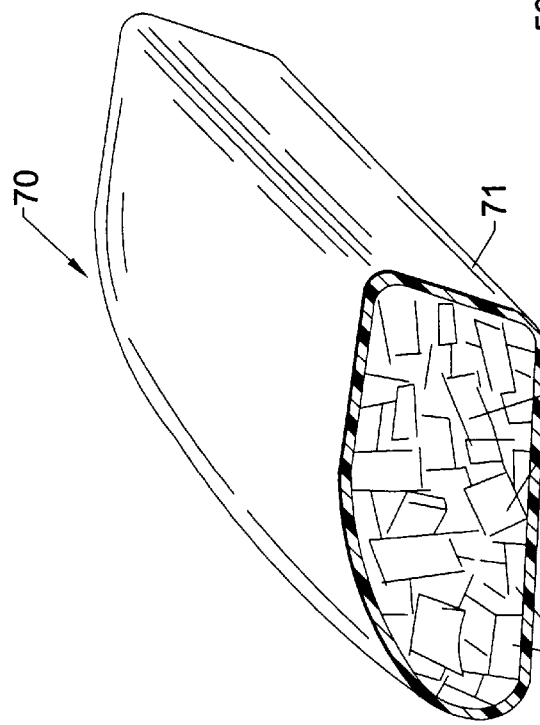
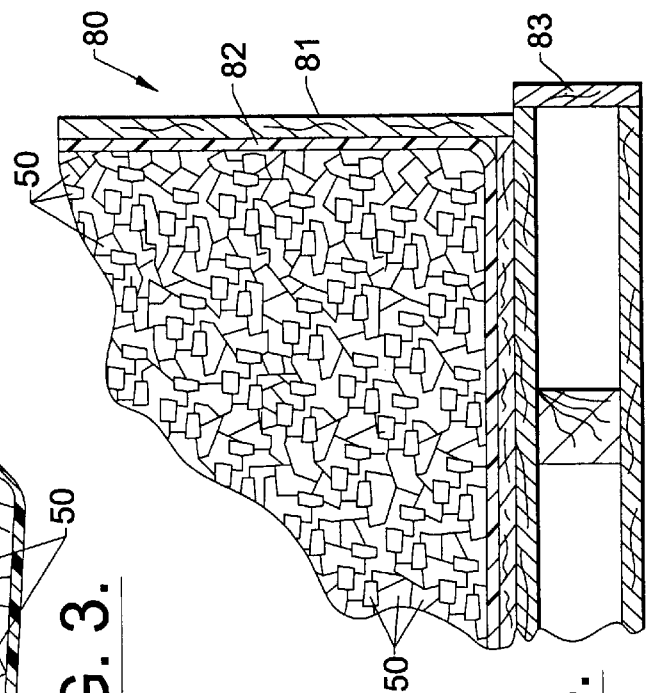
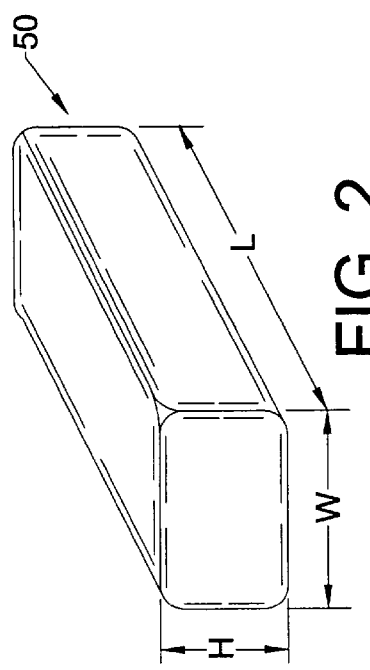
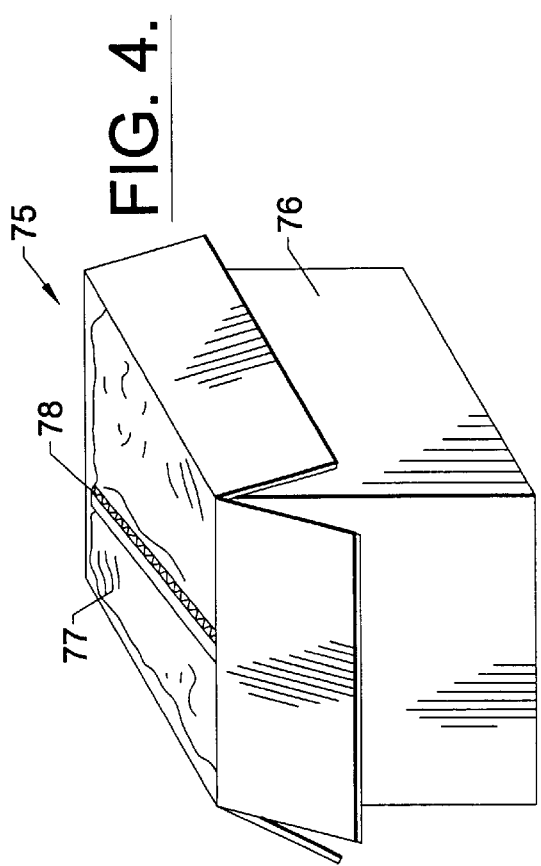

APPARATUS AND METHOD FOR MAKING CITRUS JUICE FROM FROZEN BODIES

FIELD OF THE INVENTION

The present invention relates to citrus juice, and, more particularly, to an apparatus and method for processing citrus juice.

BACKGROUND OF THE INVENTION

Citrus fruit juice drinks are widely enjoyed by many people. Unfortunately, citrus fruit have specific growing seasons, and grow only under certain climatic conditions, i.e., tropical and subtropical. Accordingly, citrus fruit are therefore available in fresh form for only a portion of the year. To have citrus fruit juice in good quality available year round and anywhere, the citrus fruit juice is typically processed for storage and distribution.

Since citrus fruit juice typically contains about 80 to 90% water, a common way to store and distribute the juice has been in the form of a concentrate, the bulk of which is a frozen concentrate. However, concentrating the juice may impair the quality of the juice, in that the volatile aroma and flavor compounds of the natural juice are reduced.

Alternately, the fresh citrus fruit juice may be frozen without any concentration. Here, relatively large containers, such as drums, are used or the juice is frozen in the form of large slabs or blocks. The size of these drums and slabs or blocks results in time-consuming freezing and thawing. In addition, large ice crystals are typically formed during the freezing. These large ice crystals typically rupture the sacs and cells if the pulp, and the ruptured sacs and cells are then diluted during the thawing.

When freezing in a conventional fashion, the temperature drops very slowly and several undesired bacterial and mold species can grow and multiply. Therefore, a pasteurisation is typically performed before freezing and is also performed upon thawing for safety reasons. This heat treatment causes degradation of the natural aroma level to a product with off-aroma and off-taste and browning of the juice and the pulp. Further deterioration of the quality of the juice is due to slow ice formation during freezing, resulting in oxidation and migration of water and sugar, such that the whole drum, slab or block of frozen juice must be thawed before further processing is possible.

Furthermore, thawing may take several days and may be subject to bacteriologic contamination and yeast fermentation. On the other hand, if the slabs or blocks are crushed in order to speed up the thawing, a high percentage of the juice sacs and other fruit cells will be mechanically ruptured or damaged and the juice quality will be severely decreased.

SUMMARY OF THE INVENTION

In view of the foregoing background, it is therefore an object of the invention to provide an apparatus and method for processing citrus juice so as to make high quality juice available year round, and in areas remote from citrus growing areas.

This and other objects, advantages, and features in accordance with the present invention are provided by an apparatus for making citrus juice comprising: a supply of relatively small frozen bodies comprising at least one of citrus juice and pulp, a heating section for adding heat to the frozen bodies to thaw the frozen bodies, and a filling section downstream from the heating section for filling juice containers with citrus juice. In one embodiment, the relatively small frozen bodies may have at least one dimension less than about 1.5 inches, such as formed during rapid freezing. The apparatus may also include a pasteurizing section upstream from the filling section.

In one embodiment, the supply comprises a plurality of portable containers each containing a plurality of frozen bodies. In this embodiment, the heating section preferably comprises a heat transfer tank, a heat transfer fluid in the heat transfer tank, a heater for the heat transfer fluid, and a conveyor for advancing the containers of frozen bodies through the heat transfer fluid. Each portable container may comprise a flexible bag, for example.

In accordance with another advantageous feature of the invention, the apparatus may include at least one other supply of liquid citrus juice. In this embodiment, a blending tank may be provided between the heating section and the filling section and connected to the at least one other supply of liquid citrus juice. The blending tank permits blending of different citrus juices, and/or for blending with concentrated juices, for example.

In accordance with another embodiment of the invention, the heating section comprises a receiving tank for receiving the frozen bodies, and a heater connected to the receiving tank. In this embodiment, at least one other supply for liquid citrus juice may be connected to the receiving tank so that the receiving tank also provides a blending function. The thawing action is based upon the relatively small bodies being in contact with liquid juice to facilitate heat transfer.

Each frozen body preferably comprises a homogenous mixture of not-from-concentrate citrus juice and/or pulp. Each frozen body may also have a generally rectangular shape.

A method aspect of the invention is for making citrus juice, and preferably comprises the steps of: supplying a plurality of frozen bodies each being relatively small and comprising at least one of citrus juice and pulp; heating the frozen bodies to thaw the frozen bodies; and filling juice containers with citrus juice. The relatively small frozen bodies may have at least one dimension less than about 1.5 inches as formed during rapid freezing. The method may also include the step of pasteurizing before filling the juice containers.

BRIEF DESCRIPTION OF THE DRAWINGS

FIG. 2 is an enlarged perspective view of an individual frozen body of citrus juice in accordance with the present invention.

FIG. 3 is a perspective cutaway view of a flexible bag container and plurality of frozen citrus juice bodies in accordance with the present invention.

FIG. 4 is a perspective view of a box and bag container for the plurality of frozen citrus juice bodies in accordance with the present invention.

FIG. 5 is a partial cross-sectional view of a portion of another container embodiment for the frozen citrus juice bodies in accordance with the present invention.

DETAILED DESCRIPTION OF THE INVENTION

Figure 1:
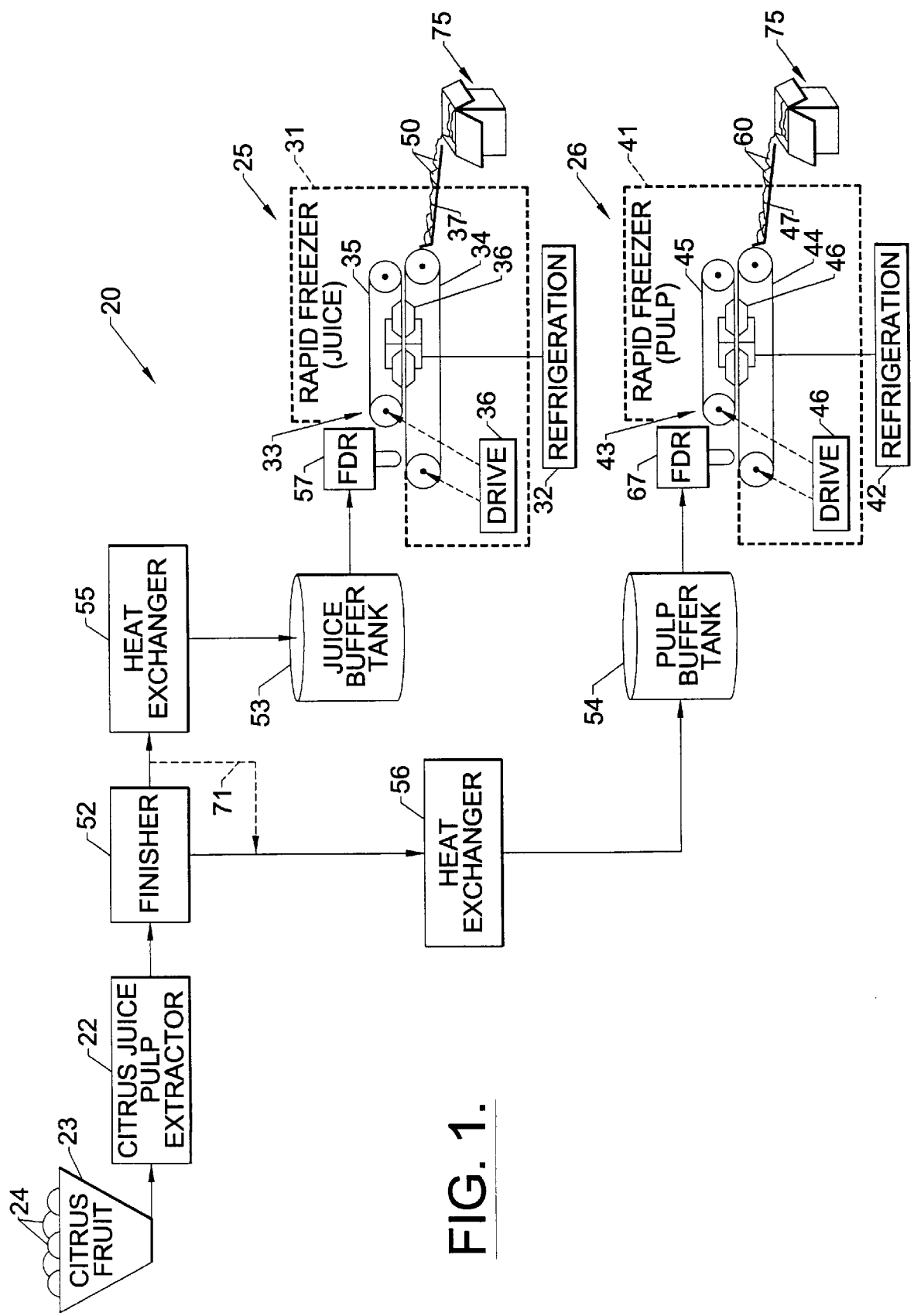
FIG. 1 is a schematic diagram of a citrus processing apparatus for producing frozen bodies of citrus juice in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1–5, a citrus fruit processing apparatus 20 and various frozen citrus related products or articles are first described. The term "citrus" as used herein, refers to all fresh citrus fruits from which a pulp portion and a juice portion can be extracted and separated, such as including oranges, grapefruits, lemons, tangerines, mandarines and limes. The processing apparatus 20 includes an extractor 22 for extracting at least one of juice and pulp from citrus fruit 24. The extraction may be carried out in a conventional extractor 22 that extracts the raw juice and pulp from the citrus fruit and separates the skin, rag, membranes and seeds.

The citrus fruit 24 are schematically illustrated as being initially held within a hopper 23. the citrus fruit 24 to be processed are typically first washed and then rinsed with water. The illustrated apparatus 20 also includes a pair of rapid freezers 25, 26 downstream from the extractor 22 for rapidly freezing the juice and pulp, respectively.

The juice rapid freezer 25, for example, includes an insulated housing 31, a refrigeration system 32 for generating a freezing zone in the housing, and a forming mechanism 33 for forming juice from the extractor 22 into a shape having at least one relatively small dimension so as to rapidly freeze in the freezing zone. The relatively small dimension may be a height dimension, which may preferably be less than about 1.5 inches, for example. This dimension may also be more preferably less than about 1 inch, and can be readily made as small as 0.5 inches. The refrigeration system 32 and the forming mechanism 33 preferably cooperate to freeze the juice in less than about 20 minutes, preferably in less than about 10 minutes, and more preferably in a range of about 2 to 5 minutes.

The forming mechanism 33 preferably produces frozen bodies having a predetermined shape, such as generally rectangular as shown by the frozen juice body 50 of FIG. 2. Those of skill in the art will readily appreciate that the corners and edges of the body 50 are rounded in view of the forming process. The rectangular shape may have dimensions of about 2 inches (L) by 1 inch width (W) by M inch height (H). Because these relatively small bodies 50 are rapidly frozen, each includes a homogenous mixture of not-from-concentrate (NFC) juice, for example. If the juice had been subject to evaporation for concentration, for example, the heating would produce certain compounds in the juice as will be readily understood by those skilled in the art. The NFC juice does not include these compounds. These bodies 50 can be readily stored for extended periods, and can be readily thawed and blended to produce high quality citrus juice as will be described in greater detail below.

The apparatus may include a finisher 52 connected between the extractor 22 and the rapid freezers 25, 26 for separating juice and pulp from each other as will be readily understood by those skilled in the art. The finisher 52 may have screens or sieves with openings of appropriate size, such that the juice portion (or fraction) passes therethrough and is separated from the pulp portion (or fraction). High-speed centrifuges may be used for further clarification of the juice stream in which the minimal particle size generally is less than 0.010 inches as will be readily understood by those skilled in the art.

The illustrated apparatus 20 includes a juice rapid freezer 25, and a pulp rapid freezer 26. As will be readily appreciated by those skilled in the art, in some embodiments, only a juice rapid freezer 25 or only a pulp rapid freezer 26 may be used. Also, a single rapid freezer may be provided which processes or freezes juice and pulp combined. In other words, it may be desired to rapidly freeze just the juice individually, or just the pulp individually, or a combination of juice and pulp together. Of course, in other embodiments one rapid freezer could be used in batch type operations for both juice and pulp.

One significant advantage of the invention is that the rapid freezer 25 can receive and process at least one of juice and pulp without intervening heating. In other words, a pasteurization step is not needed before the rapid freezing operation. Accordingly, the flavor and quality of juice later produced from the frozen bodies 50 are greatly enhanced.

The illustrated apparatus 20 includes a respective buffer tank 53, 54 for each of the juice and pulp. The apparatus 20 also includes respective heat exchangers 55, 56 for each of the juice and pulp respectively to lower the temperature before delivery to the respective feeders 57, 67 of the rapid freezers 25, 26 respectively, as will be readily understood by those skilled in the art. The schematically illustrated juice line 71 may be used to add a portion of the juice back to the pulp to make handling of the pulp easier, since the pulp may be relatively stiff without the additional juice.

Also referring to the juice rapid freezer 25 as shown in the upper right-hand portion of FIG. 1, the forming portion or mechanism 33 of the rapid freezer 25 includes a lower conveyor belt 34 defining a plurality of molds in an upper surface thereof, an upper conveyor belt 35 adjacent the lower conveyor belt, and a drive mechanism 36 for driving the lower and upper conveyor belts to pass through the freezing zone. The forming mechanism 33 may also include the schematically illustrated feeder 57 for feeding at least one of juice and pulp onto the lower conveyor belt 34. This feeding may be in an oscillating or sinusoidal pattern as will be readily appreciated by those skilled in the art.

The refrigeration system 32 may be coupled to or include a plurality of sprayers 36 for spraying chilled fluid onto the lower and upper conveyor belts 34, 35. The molds of the lower conveyor belt 34 may be provided by a corrugated shape of the belt. In addition, both the lower and upper conveyor belts 33, 34 may comprise stainless steel. The molds may produce relatively long frozen bodies which may be sawed or broken into shorter length frozen juice bodies 50 using conventional sawing or cluster breaking equipment as will be readily appreciated by those skilled in the art.

The frozen juice bodies 50 are delivered from an exit conveyor 37 for further packaging as will now be described in greater detail. Those elements in the pulp rapid freezer 26 are identified with similar references numerals as for the juice freezer 25 incremented by 10. Accordingly, these elements need no further description herein. The frozen pulp bodies are indicated by reference numeral 60; however, again for clarity of explanation, the packaging features and advantages of the present invention are generally described in terms of the frozen juice bodies 50, although the same principles apply to the frozen pulp bodies 60 or to frozen bodies including both juice and pulp.

Another aspect of the invention is directed to a citrus juice related article comprising a portable container, and a plurality of relatively small bodies 50 of frozen citrus juice in the portable container. In embodiment shown in FIG. 5, for example, each body 50 preferably has at least one dimension less than about 1.5 inches, and each body preferably comprises a homogenous mixture of NFC citrus juice. Each body 50 may have a predetermined shape, such as generally rectangular as shown in FIG. 2. In some embodiments, each body may also include citrus pulp. Of course, the invention is also applicable to the freezing and storage of bodies of citrus pulp with little or substantially no juice.

The container of the article 70 as shown in FIG. 3, for example, comprises a flexible bag 71 to provide protection against sublimation and contamination, for example, and to facilitate storage and handling. The flexible bag 71 may typically comprise plastic as will be readily understood by those skilled in the art. The flexible bag 71 may preferably comprise an opaque material to reduce the action of light on the frozen bodies. In some embodiments where exposure to light is not a concern, the bag 71 may comprise a transparent material.

The embodiment of the article 75 as shown in FIG. 4 also includes a plastic bag 77 with a fused seal 78 to maintain flavors and prevent contamination. The container also includes a generally rectangular box 76 made of corrugated paperboard surrounding the flexible bag 77. Of course, the box 76 may have other shapes and be formed from other packaging materials as will be readily understood by those skilled in the art. In addition, a rigid container, such as made of plastic, may be used without the flexible bag as will be appreciated by those skilled in the art. The rigid container may be a drum, for example.

The article 80 illustrated in FIG. 5 is a larger capacity container which would typically include a generally rectangular box 81 made of wood, for example, although other materials may also be used. The box 81 is lined with a plastic bag 82 which provides the advantages in terms of protection as noted above. In addition, the article 80 may be stored or positioned on a conventional shipping pallet 83, such as for routine automated handling using a forklift as will be readily understood by those skilled in the art. The bags 71 as shown in FIG. 3 may also be stacked on a pallet as will also be appreciated by those skilled in the art.

In addition, a container for the frozen citrus juice bodies 50 may have different capacities depending on the application. For example, for manual handling, the container, such as the bag 71 of the article 70 as shown in FIG. 3, may have a capacity in a range of about 3 to 10 gallons. For automated handling and storage in a refrigerated warehouse, for example, a larger container, such as the wood box 81 and bag 82 of the article 80 of FIG. 5, may have a capacity in a range of about 250 to 350 gallons, with 300 gallons being a typical size.

In addition to the containers described above with reference to FIGS. 3–5 including the frozen bodies 50 as described above, the invention is also directed to the individual frozen bodies 50 themselves. Each frozen body 50 is preferably a generally rectangular body having at least one dimension less than about 1.5 inches, and as small as 0.5 inches or less, and each body 50 preferably comprises a homogenous frozen mixture of NFC citrus juice. The frozen body may include pulp, or may be pulp with substantially no juice as will be readily appreciated by those skilled in the art.

Figure 6:
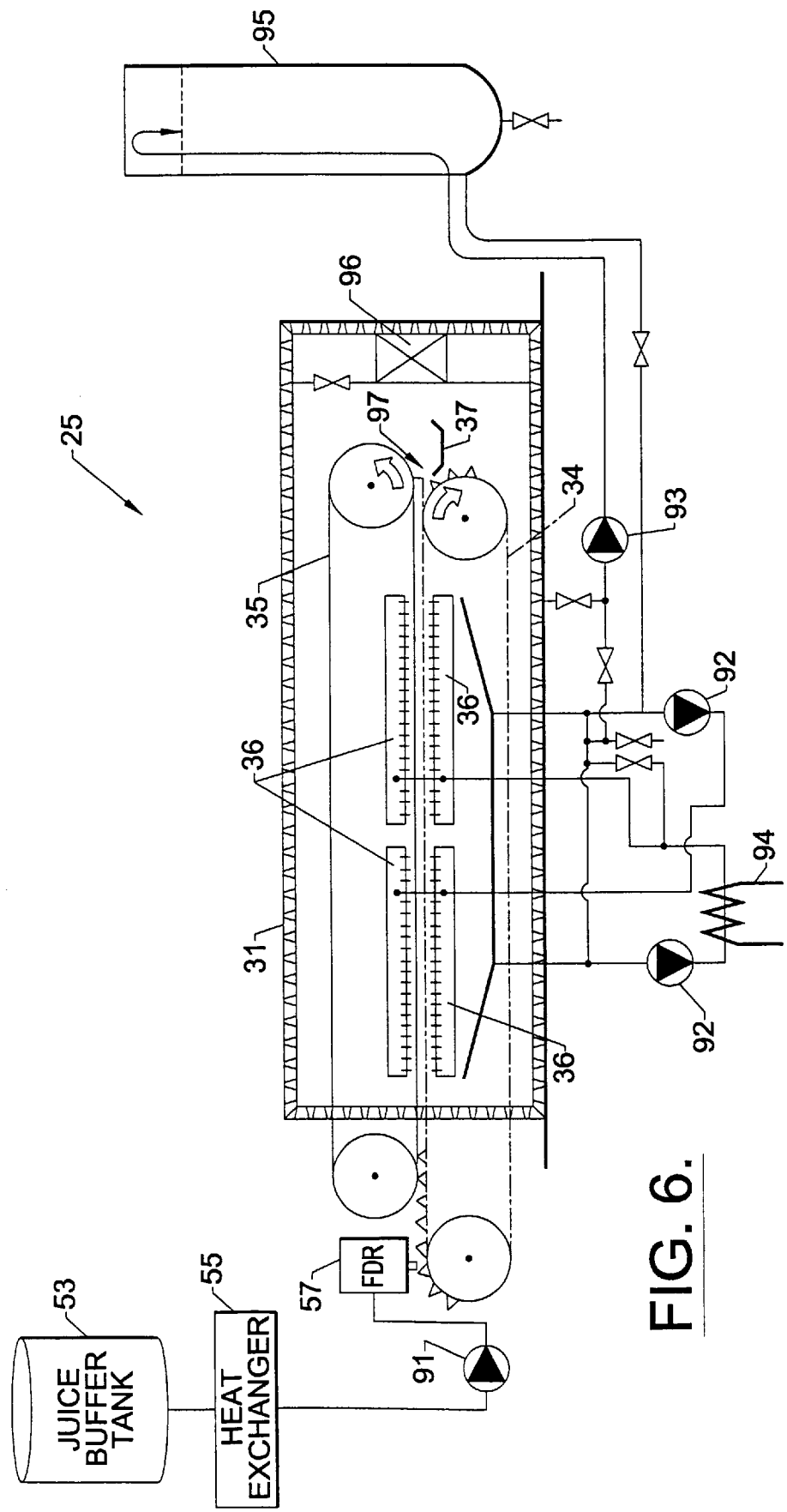
FIG. 6 is a more detailed diagram of a portion of the processing apparatus as shown in FIG. 1.

Referring now additionally to FIG. 6, the juice rapid freezer 25 is more fully described. The juice rapid freezer 25 may be of the type disclosed in U.S. Pat. No. 3,774,409 to Persson et al. and U.S. Pat. No. 4,748,029 to Alfred et al. Of course, other types of rapid freezers are also contemplated by the present invention. In addition to those components already discussed above, the illustrated rapid freezer 25 includes a product infeed pump 91, brine circulation pumps 92, a brine cooler 94, a brine storage tank 95, and a drain circulation pump 93. The corrugations of the lower conveyor belt 34 are clearly visible in the left-hand portion of FIG. 6. An air cooler 96 is provided within the insulated housing 31. The final forming device 97 is schematically illustrated at the exit end of the lower and upper conveyor belts 34, 35. The rapid freezer 25 also includes a seal arrangement adjacent the side edges of the lower and upper conveyor belts 34, 35, not shown. The pulp rapid freezer 26 may be substantially identical to the juice rapid freezer 25, and, hence, the pulp rapid freezer needs no further discussion herein.

Figure 7:
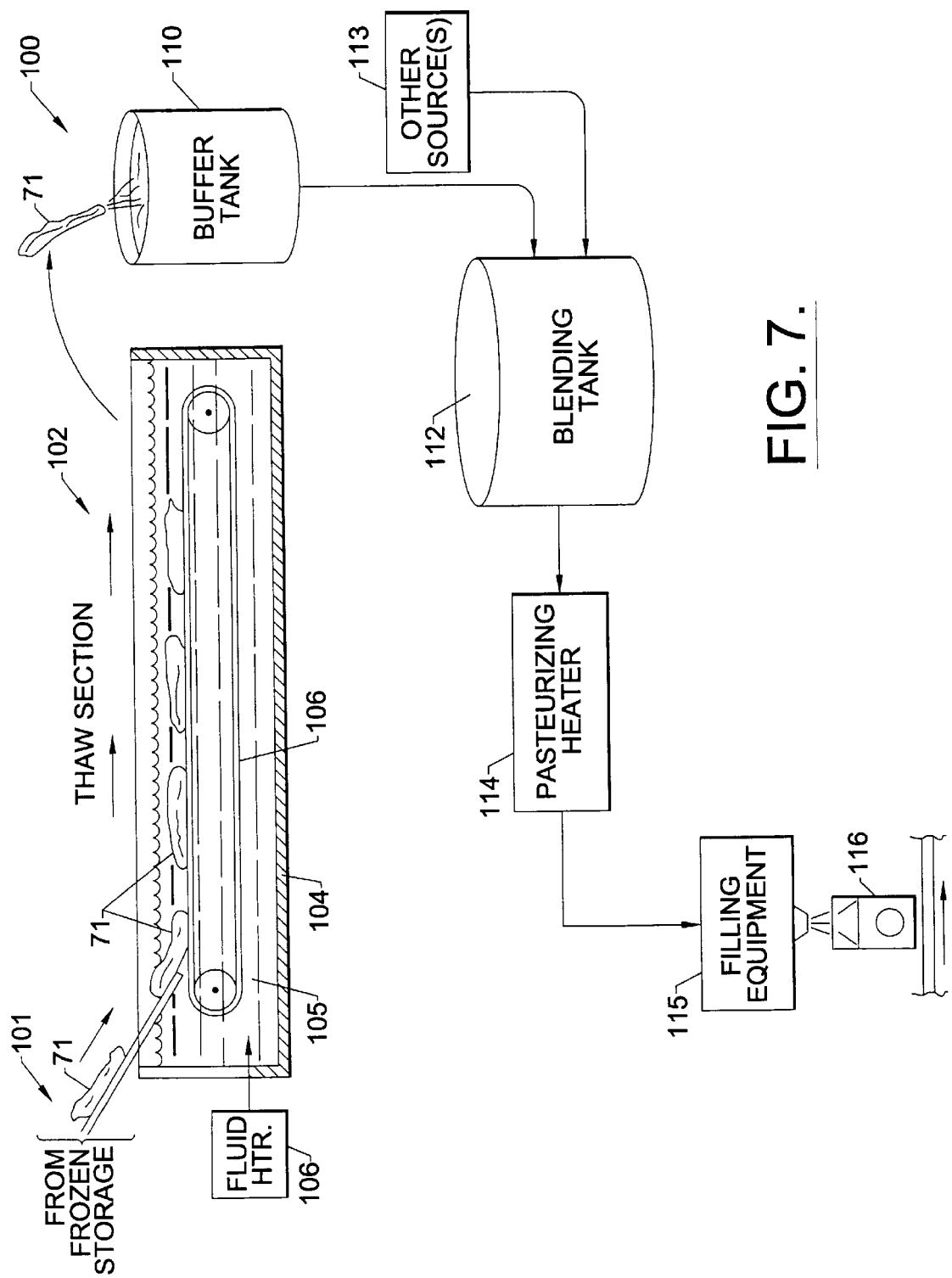
FIG. 7 is a schematic diagram of a processing apparatus for further processing the frozen citrus juice bodies into citrus juice in accordance with the invention.

Turning now additionally to FIG. 7, various portions of another processing apparatus in the form of a juice making apparatus 100 according to one embodiment of the invention is now described. The juice making apparatus 100 uses the frozen bodies produced by the initial processing apparatus 20 described extensively above. The apparatus 100 includes a supply 101 of relatively small frozen bodies comprising at least one of citrus juice and pulp, a heating or thawing section 102 for adding heat to the frozen bodies to thaw the frozen bodies, and a filling section 115 downstream from the heating section for filling juice containers 116 with citrus juice. In one embodiment, the relatively small frozen bodies 50, 60 may have at least one dimension less than about 1.5 inches. The apparatus 100 may also include a pasteurizing section 114 upstream from the filling section as shown in the illustrated embodiment.

As shown in FIG. 7, the supply 101 comprises a plurality of portable containers in the form of flexible bags 71 as shown in FIG. 3, for example. However, the containers could also be rigid and have different sizes and shapes as will be readily appreciated by those skilled in the art. In the illustrated embodiment, each flexible bag 71 includes a plurality of frozen bodies. In this embodiment, the heating section 102 comprises a heat transfer tank 104, a heat transfer fluid 105 in the heat transfer tank, a heater 105 for the heat transfer fluid, and a conveyor 106 for advancing the containers of frozen bodies through the heat transfer fluid. The bags 71 could also be conveyed through the heat transfer fluid 105 by an overhead conveyor, for example, as will be readily appreciated by those skilled in the art.

The heating section 102 of FIG. 7 is provided to illustrate the broad concept of partially or completely thawing the frozen bodies by passing the containers through a heat exchanging fluid. Those of skill in the art will appreciate other equivalent approaches which are also contemplated by the present invention. For example, the containers may also be exposed to a steam environment, or be sprayed with a heated liquid.

Downstream from the heating section 102, a station is provided for opening the bags 71 and dispensing the partially or completely thawed contents into a buffer tank 110. The buffer tank 110 is selectively connectable to a downstream blending tank 112. The blending tank 112 is also illustratively connected to at least one other source 113 which may provide other juice(s) for blending into a final desired product as will be readily understood by those skilled in the art. In other embodiments, the buffer tank 110 may provide the tank for blending. The blending operation could include the addition of pulp or juice from other frozen supplies of other citrus fruits, could be fresh juice or pulp, and/or could include portions of concentrated juice.

Figure 8:
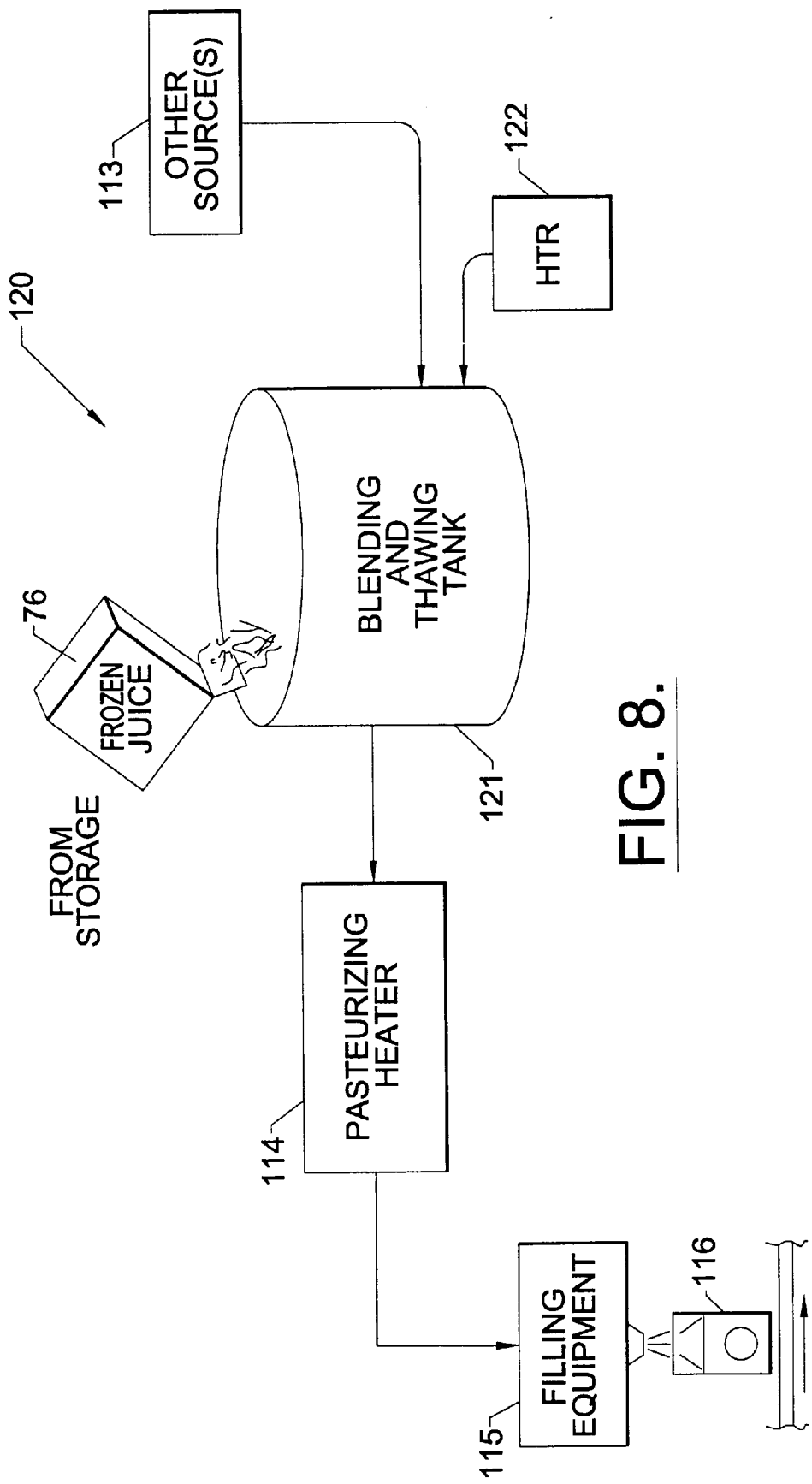
FIG. 8 is a schematic diagram of another embodiment of a processing apparatus for processing the frozen citrus juice bodies into citrus juice in accordance with the invention.

Turning now to FIG. 8, a different type of juice making apparatus 120 is now described. The apparatus 120 takes advantage of another highly advantageous property of the frozen bodies 50, 60. In particular, the supply of frozen bodies 50, 60 can be directly added from a box 76 of frozen bodies to a blending/thawing tank 121. Because the frozen bodies are relatively small, they quickly absorb heat from the surrounding liquid juice as will be understood by those skilled in the art.

A pasteurizing heater 114 and conventional fill station 115 are connected downstream of the blending/thawing tank 121. A heater 122 is connected to the blending/thawing tank 121 to provide heat thereto. The blending/thawing tank 121 would typically include a portion of liquid therein to assist in heat transfer to the frozen bodies as they are added to the tank.

To provide the optional blending features, one or more other sources 113 of juice and/or pulp can be connected to the blending/thawing tank 121 as shown in the illustrated embodiment. The embodiment of a juice making apparatus 120 may include additional components and is shown in simplified schematic form for ease of understanding the principles of the invention. This apparatus 120 is illustrative of the broad class of juice making apparatus where the frozen bodies are directly added to liquid juice for thawing as will be appreciated by those skilled in the art.

One method aspect of the invention is for processing citrus fruit and comprises the steps of: extracting at least one of juice and pulp from citrus fruit, and rapidly freezing at least one of juice and pulp after extraction by forming at least one of juice and fruit into a shape having at least one relatively small dimension while passing through a freezing zone. In particular, the step of rapidly freezing may comprise providing at least one rapid freezer 25 including a housing 31, a refrigeration system 32 for generating the freezing zone in the housing, and a forming mechanism 33 for at least one of juice and pulp. The at least one relatively small dimension may be a height dimension which is less than about 1.5 inches, for example.

The step of rapidly freezing preferably comprises freezing at least one of juice and pulp in less than about 20 minutes, and, more preferably, in a range of about 2 to 5 minutes. The step of rapidly freezing also preferably comprises rapidly freezing at least one of juice and pulp without intervening heating to thereby preserve the high quality flavor.

Another method aspect of the invention is for storing citrus juice. This method preferably comprises the steps of: forming a plurality of relatively small bodies 50 of frozen citrus juice, each body preferably having at least one dimension less than about 1.5 inches; placing the plurality of relatively small bodies into at least one container, such as the bag 71 (FIG. 3); and maintaining a temperature of the plurality of relatively small bodies in the at least one container below a freezing temperature of the citrus juice. An inert gas, such as nitrogen or carbon dioxide, for example, may be added to the container to preserve freshness.

The step of forming the plurality of relatively small bodies 50 preferably comprises forming each comprising a homogenous mixture of NFC citrus juice. The bodies may also include citrus pulp, or may include primarily citrus pulp with substantially no juice. The container is preferably portable and may comprise a flexible bag 71, for example. The container may further include a generally rectangular box 76 surrounding the flexible bag.

Yet another method aspect of the invention is for making citrus juice, and preferably comprises the steps of: supplying a plurality of frozen bodies each being relatively small and comprising at least one of citrus juice and pulp; heating the frozen bodies to thaw the frozen bodies; and filling juice containers 116 (FIG. 7, for example) with citrus juice. The relatively small frozen bodies 50 may have at least one dimension less than about 1.5 inches. The method may also include the step of pasteurizing before filling the juice containers 116.

The present invention provides an apparatus and process of preparing and distributing NFC juice without, of course, any concentration and substantially without deterioration as compared to fresh juice. The present invention facilitates the making of several mixes of NFC juice using different types of citrus fruits, citrus fruits of different maturity, and different proportions of the pulp portions and the juice portions of these citrus fruits. The invention also meets the increased need for processing and hygiene improvements to ensure the health of customers as regards their food intake.

The separate containers may be distributed to a local packer or blender. NFC juice may be prepared by selecting frozen pulp bodies and frozen juice bodies separately distributed to the local blender, from selected types of citrus fruit and in predetermined proportions. Thawing and mixing the selected frozen pulp bodies and frozen juice bodies can be done to obtain a desired blend of NFC citrus fruit juice. The NFC citrus fruit juice can be filled in retail containers for sale.

The invention also provides for distributing the containers to a packer, and preparing NFC juice by thawing the mix of selected pulp bodies and juice bodies so as to obtain an NFC citrus fruit juice of a desired aroma, mouth feel and flavor. In this variation, the mixing of the frozen pulp bodies and the frozen juice bodies is made when packaging these bodies for the first distribution, i.e., the mix is determined and made before the first distribution. Hereby, when thawing the mix, a NFC citrus fruit juice is obtained to be used directly or to be dispensed for distribution to the user. Further, the quality of the thawed juice can be guaranteed by this premixing.

The above-described processes and apparatus are advantageous in that they enable a fast freezing after extraction since no concentration of the extracted fruit juice is involved. Further, by freezing the pulp portion and the juice portion in the form of small bodies the freezing is speeded up, a more hygienic process is achieved and a consistent and safe quality may be obtained as compared to freezing times of several hours (slabs and blocks) or several days (drums) in the prior art. Thus, the above-mentioned contamination risks are reduced by the prompt freezing into bodies, such as in a continuous in-line process. Also, after storage and transport to the blender or packer, the juice bodies and pulp bodies can be continuously thawed together or separately in line with packaging.

This fast freezing results in improved quality with better flavor and aroma. More precisely, enzymatic and bacterial activity is effectively stopped or reduced to an adequately low level. Also, the nutritional value of NFC citrus fruit juice, e.g. contents of vitamin C, will be comparable to that of fresh citrus fruit juice.

The reduced, fully automated and almost enclosed processing of the NFC juice before and during freezing also results in less breakage or damage of the juice sacs of the pulp portion and thus better pulp quality and a better floatation which adds up to a huge quality improvement. Further, a substantial yield improvement is obtainable through the above processes according to the invention. By freezing the pulp and juice portions as bodies, these bodies can be stored and transported in large containers, such as plastic bags, which results in a reduction of cost for packaging compared to packaging in drums. Still, the bodies can be quickly thawed and easily mixed in any volume and in any selected combination for the retail packaging. This is a consequence of that all the bodies have the same concentration. Thus, the lead-times of several days to thaw drums, slabs or blocks at the blender or packer are eliminated, since juice and pulp from frozen bodies can be packaged the same day and delivered to the marketplace. Also, bodies can be thawed quickly in a continuous process where frozen bodies are added to a batch of already thawed bodies.

As described herein the process for preparing and distributing NFC juice may be modified in that only the separated pulp portion or only the separated juice portion is frozen into bodies. In this case, the non-frozen portion is distributed in liquid or substantially liquid state, e.g., aseptically packaged.

As a result of this quick freezing process, the frozen NFC bodies retain a high level of aromatic flavor components, and they have no cooked flavor components since no traditional heat treatment, such as pasteurisation, need be used. Further, the juice sacs are of higher quality, i.e., as size and integrity are concerned, than those of juice which has been concentrated in an evaporator and subsequently mixed with pulp which has been frozen by a slow process forming large ice crystals and migration.

Juice sac integrity is largely controlled by the rate of freezing. Traditional slow freezing methods result in the formation of large ice crystals, which break the juice sac membranes yielding small size, broken, and non-floating particles. Rapid freezing, as accomplished in accordance with one aspect of the invention results in the formation of much smaller ice crystal and therefore less disruption of the juice sacs. By the rapid freezing of the bodies, controlled and very fast, the fresh quality characteristics in the pulp are saved. Further, chemical reactions are reduced more effectively. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for making citrus juice comprising:
   a supply comprising a plurality of portable containers each containing a plurality of frozen bodies each being relatively small and having at least one dimension less than about 1.5 inches, each frozen body comprising at least one of citrus juice and pulp;
   a heating section for adding heat to the frozen bodies to thaw the frozen bodies, said heating section comprising
   a heat transfer tank,
   a heat transfer fluid in said heat transfer tank,
   a heater for the heat transfer fluid, and
   a conveyor for advancing the portable containers of frozen bodies through the heat transfer fluid; and
   a filling section downstream from said heating section for filling juice containers with citrus juice from the thawed frozen bodies.

2. The apparatus according to claim 1 further comprising a pasteurizing section upstream from said filling section.

3. The apparatus according to claim 1 wherein each portable container comprises a flexible bag; and wherein said conveyor advances the flexible bags.

4. The apparatus according to claim 1 further comprising:
   at least one other supply of liquid citrus juice; and
   a blending tank between said heating section and said filling section and connected to said at least one other supply of liquid citrus juice.

5. The apparatus according to claim 1 wherein said heating section further comprises:
   a receiving tank for receiving the frozen bodies; and
   a heater connected to said receiving tank.

6. The apparatus according to claim 5 further comprising at least one other supply for liquid citrus juice connected to said receiving tank so that said receiving tank also provides a blending function.

7. The apparatus according to claim 1 wherein each frozen body comprises a homogenous mixture of not-from-concentrate citrus juice.

8. The apparatus according to claim 1 wherein each frozen body comprises a homogenous mixture of not-from-concentrate citrus pulp.

9. The apparatus according to claim 1 wherein each frozen body has a generally rectangular shape.

10. The apparatus according to claim 9 wherein the rectangular shape has dimensions of about 2 by 1 by ½ inch.

11. An apparatus for making citrus juice comprising:
    a supply of a plurality of portable containers, each portable container containing a plurality of frozen bodies, each frozen body being relatively small comprising at least one of citrus juice and pulp;
    a heat transfer tank;
    a heat transfer fluid in said heat transfer tank;
    a heater for the heat transfer fluid;
    a conveyor for advancing the portable containers of frozen bodies through the heat transfer fluid for adding heat to the frozen bodies to thaw the frozen bodies; and
    a filling section downstream from said heat transfer tank for filling juice containers with citrus juice from the thawed frozen bodies.

12. The apparatus according to claim 11 further comprising a pasteurizing section upstream from said filling section.

13. The apparatus according to claim 11 wherein each portable container comprises a flexible bag; and wherein said conveyor advances the flexible bags.

14. The apparatus according to claim 11 further comprising:
    at least one other supply of liquid citrus juice; and
    a blending tank between said heating transfer tank and said filling section and connected to said at least one other supply of liquid citrus juice.

15. The apparatus according to claim 12 wherein each frozen body comprises a homogenous mixture of not-from-concentrate citrus juice.

16. The apparatus according to claim 11 wherein each frozen body comprises a homogenous mixture of not-from-concentrate citrus pulp.

17. The apparatus according to claim 11 wherein each frozen body has at least one dimension less than about 1.5 inches.

18. The apparatus according to claim 11 wherein each frozen body has a generally rectangular shape.

19. The apparatus according to claim 18 wherein the rectangular shape has dimensions of about 2 by 1 by ½ inch.

20. A method for making citrus juice comprising the steps of:

supplying a plurality of frozen bodies in portable containers, each frozen body being relatively small and having at least one dimension less than about 1.5 inches, each frozen body comprising at least one of citrus juice and pulp;

heating the frozen bodies by advancing the portable containers of frozen bodies through a heat transfer fluid to thaw the frozen bodies; and filling juice containers with citrus juice from the thawed frozen bodies.

21. The method according to claim 20 further comprising the step of pasteurizing before filling the juice containers.

22. The method according to claim 21 wherein each portable container comprises a flexible bag.

23. The method according to claim 20 further comprising the steps of:

blending at least one other supply of liquid citrus juice to at least one of thawed citrus juice and pulp from the frozen bodies before the filling the juice containers.

24. The method according to claim 20 wherein the step of heating comprises the steps of:

receiving the frozen bodies in a receiving tank; and heating contents of the receiving tank.

25. The method according to claim 24 further comprising the step of blending liquid citrus juice from at least one other supply thereof in the receiving tank.

26. The method according to claim 20 wherein each frozen body comprises a homogenous mixture of not-from-concentrate citrus juice.

27. The method according to claim 20 wherein each frozen body comprises a homogenous mixture of not-from-concentrate citrus pulp.

28. The method according to claim 20 wherein each frozen body has a generally rectangular shape.

29. The method according to claim 28 wherein the rectangular shape has dimensions of about 2 by 1 by ½ inch.

* * * * *

UNITED STATES PATENT AND TRADEMARK OFFICE
CERTIFICATE OF CORRECTION

PATENT NO. : 6,190,718 B1
DATED : February 20, 2001
INVENTOR(S) : Lars Eek, Kenneth I. Fox and Sten Pahlsson It is certified that error appears in the above-identified patent and that said Letters Patent is hereby corrected as shown below:

Column 1,
Line 32, delete "cells if the" insert -- cells of the --

Column 3,
Line 27, delete "23. the citrus" insert -- 23. The citrus --
Line 52, delete "M inch" insert -- ½ inch --

Column 9,
Line 37, delete "ice crystal" insert -- ice crystals --

Signed and Sealed this

First Day of June, 2004

JON W. DUDAS
*Acting Director of the United States Patent and Trademark Office*